Patented Dec. 26, 1939

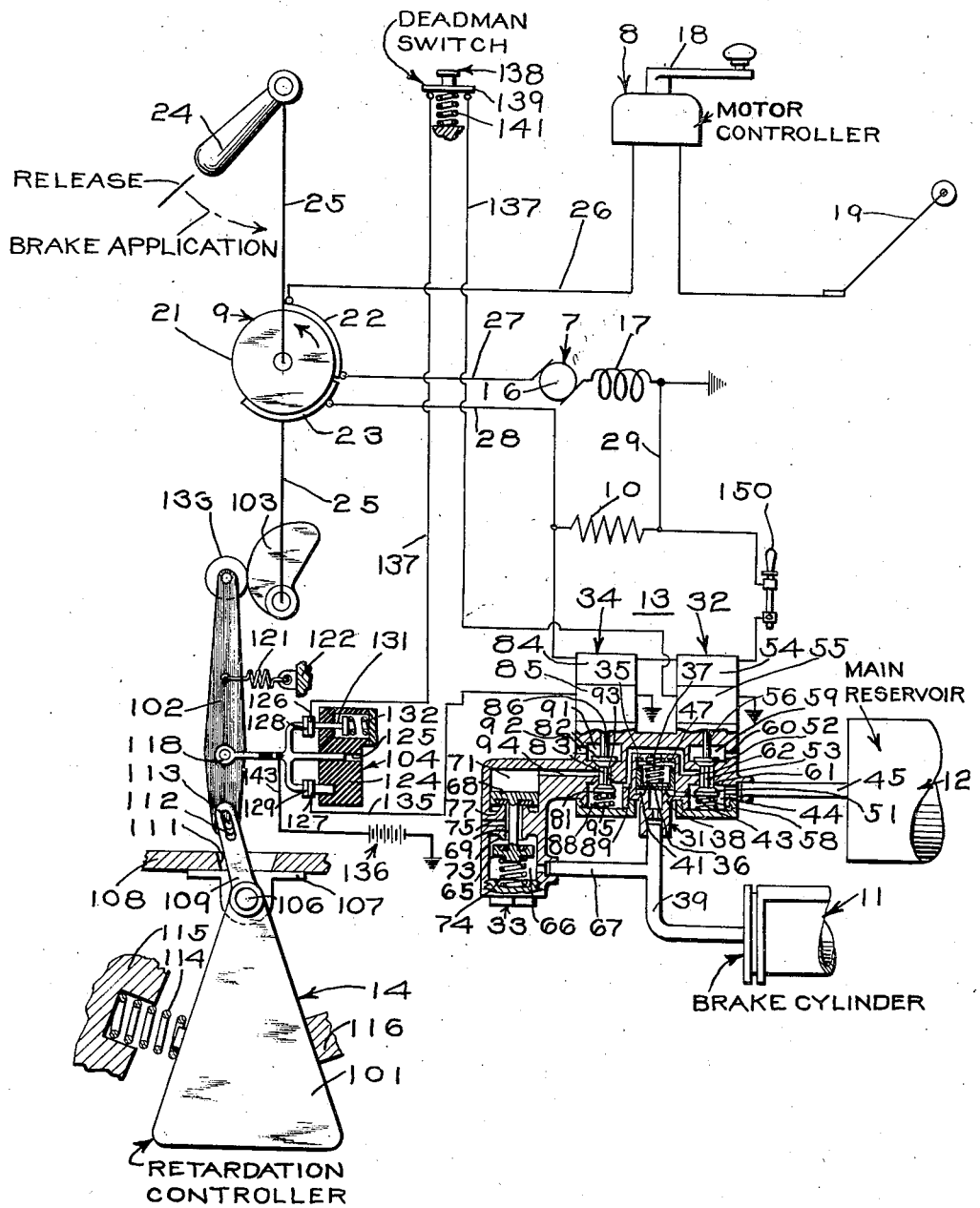

2,184,557

UNITED STATES PATENT OFFICE 2,184,557

BRAKE SYSTEM

David W. Lloyd, Webster Groves, Mo., assignor to The Westinghouse Air Brake Company, Wilmerding, Pa., a corporation of Pennsylvania Application June 26, 1937, Serial No. 150,503

14 Claims. (Cl. 303—3)

This invention relates to brake systems and particularly to vehicle brake systems having one or more electric brake equipments and a fluid pressure brake equipment.

Various vehicle brake systems have been heretofore proposed including an electric brake equipment, such as a dynamic brake equipment and a fluid pressure brake equipment, in which the application of the fluid pressure brake is prevented or altered by the degree of braking produced by the dynamic brake equipment as measured by the current flowing in the dynamic brake circuit. It is an object of my invention to provide a novel arrangement whereby application of a fluid pressure brake may be prevented or altered in degree by the rate of retardation produced by the dynamic and other brakes acting separately or in combination.

Another object of my invention is to provide a retardation controller of the inertia type which is constructed and arranged in a novel manner to regulate the degree of a brake application on a vehicle according to the degree of operative movement of a brake control element out of a normal brake release position.

Another object of my invention is to provide a novel arrangement including a "deadman" device for effecting an application of the brakes automatically upon incapacitation of the operator of the vehicle.

The above objects, and other objects of my invention which will be made apparent hereinafter, are attained by means of an illustrative embodiment of my invention which will be subsequently described and which is shown in the single figure of the accompanying drawing.

Referring to the single figure, the equipment shown includes a simplified vehicle motor control system, including a vehicle motor 7, a suitable motor controller 8, and a drum controller 9 operated upon an application of the brakes to change the electrical connections to the motor 7 to establish a dynamic braking circuit including a braking resistor 10. The equipment shown further includes a fluid pressure brake system comprising a brake cylinder 11, a source of fluid pressure supply such as a main reservoir 12, a magnet valve mechanism 13 for controlling the supply of fluid under pressure from the reservoir 12 to the brake cylinder 11 and the release of fluid under pressure from the brake cylinder 11, and a retardation controller 14 arranged to control the operation of the magnet valve mechanism 13.

Considering now the various parts in greater detail, the vehicle motor 7 comprises an armature 16 and a series field winding 17.

The motor controller 8 is of any well known type including a rotary drum, not shown, having suitably arranged contact segments thereon and effective upon rotation of the rotary drum by an operating handle 18 to control the supply of current as from an external source through a trolley 19 to the motor 7.

The drum controller 9 is illustrated diagrammatically in simplified form as comprising a rotary drum 21 carrying an insulated relation thereon at the periphery thereof a pair of separate contact segments 22 and 23. The drum 21 is adapted to be rotated according to the operative movement of a rotary brake control handle 24, as by being fixed to a common shaft 25 in the manner indicated. With the brake operating handle 24 in its normal brake release position shown, the contact segment 22 on the rotary drum 21 is positioned to establish an electrical connection between a wire 26 leading to the motor controller 8 and a wire 27 connected to one brush terminal of the motor 7 thus rendering the motor controller 8 effective to control the supply of current to the motor and accordingly the speed of the vehicle.

When the brake control handle 24 is shifted in a counterclockwise direction into an application zone in the manner indicated by the arrow, the rotary drum 21 is correspondingly rotated in a counterclockwise direction to shift the contact segment 22 so as to disengage the wire 27, thus interrupting the motor control circuit, and to cause contact segment 23 to engage the wire 27 and connect it to a wire 28 connected to one terminal of the dynamic brake resistor 10, the opposite terminal of which is connected to the grounded terminal of the field winding 17 by a wire 29.

The magnet valve mechanism 13 comprises a casing having embodied therein an application valve device 31, an application magnet pilot valve device 32, a release valve device 33 and a release magnet pilot valve device 34.

The application valve device 31 comprises a valve piston 36 which is adapted to be subject on one side to the force of fluid under pressure in a chamber 35 and of a coil spring 37 which urges it into seated relation on an annular rib seat 38 to close communication between a passage 39, open to the inner seated area of the valve piston 36 and to which a pipe 39 leading to the brake cylinder 11 is connected, and a chamber 41 at the outer seated area of the valve piston 36. The chamber 41 is constantly connected through a passage 43 to a chamber 44 which is constantly charged with fluid under pressure from the main reservoir 12 through a pipe 45.

The valve piston 36 is maintained seated on the annular rib seat 38 against the force of the fluid pressure in the chamber 41 at the outer seated area thereof by the combined force of the spring 37 and the pressure of the fluid supplied to the chamber 35 containing the spring. When fluid under pressure is released from the chamber 35, the higher pressure of the fluid in the chamber 41 unseats the valve piston 36 from the annular rib seat 38 against the force of the spring 37 and shifts it upwardly into seated relation on an annular gasket seat 47 to prevent leakage past the valve piston 36 from the main reservoir 12. When the valve piston 36 is unseated from the annular rib seat 38, communication is established between the chamber 41 and the passage and pipe 39 so that fluid under pressure is supplied from the main reservoir 12 to the brake cylinder 11.

Fluid under pressure is supplied to and released from the chamber 35 of the application valve device 31 under the control of the application magnet pilot valve device 32. The application magnet pilot valve device 32, hereinafter referred to as the application pilot valve device, comprises a pair of oppositely seating valves 51 and 52 connected by a fluted stem 53 and operated by either of two separate coaxially disposed magnet windings 54 and 55 through the medium of a common operating stem 56 actuated by either of the magnets 54 or 55. The valve 51 of the application pilot valve device 32 is contained in chamber 44, previously referred to, and is subject to the force of a coil spring 58 which is effective to yieldingly urge the valve 51 and the valve 52 to seated and unseated positions, respectively, when the magnets 54 and 55 are both deenergized. The valve 52 is contained in a chamber 59 which is constantly connected to atmosphere through an exhaust port 60, and to the chamber 44 by a bore 61, through which the fluted stem 53 connecting the valves 51 and 52 extends.

The chamber 35 of the application valve device 31 is constantly connected through a passage 62 to the bore 61 and, when the valve 52 is unseated, is connected to the chamber 59 and thus to atmosphere through the exhaust port 60. At the same time, the valve 51 is in seated position and cuts off communication between the chamber 44 and the passage 62 leading to the chamber 35 of the application valve device 31 to prevent the supply of fluid under pressure from the main reservoir 12 to the chamber 35.

Upon the energization of either the magnet winding 54 or the magnet winding 55, the plunger or stem 56 is actuated downwardly to cause the valves 51 and 52 to be unseated and seated, respectively, against the force of the spring 58. The valve 52, when seated, cuts off the exhaust communication from the chamber 35 of the application valve device, and the valve 51 when unseated establishes communication through which fluid under pressure is supplied from chamber 44 and the main reservoir 12 to the chamber 35. It will thus be seen that when both of the magnet windings 54 and 55 are deenergized, the chamber 35 of the application valve device is vented to atmosphere through the port 60 of the application pilot valve device 32 and that the valve piston 36 is accordingly unseated to establish communication through which fluid under pressure is supplied from the main reservoir 12 into the passage and pipe 39 and to the brake cylinder 11. It will also be seen that when either of the magnet windings 54 or 55 is energized, fluid under pressure is supplied to the chamber 35 of the application valve device 31 and that the valve piston 36 is accordingly seated to prevent the supply of fluid under pressure from the main reservoir 12 to the brake cylinder 11.

The release valve device 33 comprises a valve 65 contained in a chamber 66 which is constantly connected through a branch pipe 67 to the pipe 39 leading to the brake cylinder 11, the valve 65 being operated by a piston 68 connected as by a stem 69 to the valve 65. At one side of the piston 68 is a chamber 71 and when fluid under pressure is supplied to the chamber 71, it shifts the piston 68 downwardly into seated relation on an annular gasket 72, to prevent leakage of fluid under pressure past the piston from chamber 71, and simultaneously unseats the valve 65 from an annular rib seat 73 against the resisting force of a coil spring 74 contained in the chamber 66 and acting on the valve 65. When fluid under pressure is released from the chamber 71, the spring 74 shifts the valve 65 into seated relation on the annular rib seat 73.

When the valve 65 is unseated it establishes communication between the chamber 66 and an exhaust port 75 and since the chamber 66 is constantly connected to the brake cylinder 11 it causes fluid under pressure to be released from the brake cylinder to release the brakes. When the valve 65 is seated on the annular rib seat 73 it cuts off the exhaust communication for the brake cylinder and causes pressure to be maintained in the brake cylinder or built up therein under the control of the application valve device 31.

The supply of fluid under pressure to and the release of fluid under pressure from the chamber 71 of the release valve device 33 is under the control of the release magnet pilot valve device 34, hereinafter called the release pilot valve device. The release pilot valve device 34 comprises a pair of oppositely seating valves 81 and 82 connected by a fluted stem 83 and operated by two separate coaxially disposed magnet windings 84 and 85 through the medium of a plunger or stem 86 actuated by either of the magnet windings. The valve 81 is contained in a chamber 88 which is constantly connected to the chamber 35 of the application valve device 31 through a passage 89, and the valve 82 is contained in a chamber 91 which is constantly connected to atmosphere through an exhaust port 92. The two chambers 88 and 91 are connected by a bore 93 through which the fluted stem 83 connecting the valves 81 and 82 extends and the bore 93 is constantly connected to the chamber 71 of the release valve device 33 through a passage 94.

When either the magnet winding 84 or the magnet winding 85 is energized, the plunger 86 is actuated to shift the valves 81 and 82 to unseated and seated positions, respectively, against the resisting force of a yielding spring 95 contained in the chamber 88 and acting on the valve 81.

With the valve 81 unseated, communication is established between the chamber 88 and the passage 94 leading to the chamber 71 of the release valve device 33. It will thus be apparent that if the chamber 35 of the application valve device 31 is charged with fluid under pressure under the control of the application pilot valve device 32 while the valve 81 of the release pilot valve device 34 is unseated, fluid under pressure will be supplied to the chamber 71 to cause the valve 65 to be unseated from the annular rib seat 73, thereby causing fluid under pressure to be released from the brake cylinder 11. If the chamber 35 of the application valve device 31 is vented to atmosphere under the control of the application pilot valve device 32 while valve 81 is unseated, then the chamber 71 of the release valve device 33 will also be vented to atmosphere through the exhaust port 60 of the application pilot valve device 32. The valve 65 of the release valve device 33 will thus be seated by the spring 74 to prevent the exhaust of fluid under pressure from the brake cylinder.

When both of the magnet windings 84 and 85 of the release pilot valve device 34 are deenergized, the spring 95 shifts the valves 81 and 82 to seated and unseated positions, respectively. The valve 81, when seated, cuts off communication from the chamber 88 and the connected chamber 35 of the application valve device 31 to the chamber 71 of the release valve device 33 and the valve 82 when unseated establishes communication between the chamber 71 and atmosphere by way of the passage 94, chamber 91 and exhaust port 92.

The retardation controller 14 comprises an inertia element 101, illustrated as a pendulum, a floating lever 102, a rotary cam 103, and a switch device 104.

Although the inertia element 101 is shown as a pendulum, it will be understood that any other type of inertia element, such as a heavy block on rollers, may be provided. The inertia element 101 is pivotally suspended, as on a pin or shaft 106 carried by a bracket 107 fixed to a stationary part 108 of the vehicle frame or truck. Formed integrally with or attached to the upper end of the inertia element 101 is an arm 109 which projects through an opening 111 in the stationary part 108 of the vehicle frame and which has an elongated opening 112 at the outer end thereof in which is received a lug or pin 113 at one end of the floating lever 102.

The inertia element 101 is normally maintained in the position shown by a spring 114 which is interposed between a casing 115 fixed to the vehicle frame and one edge of the inertia element 101, a fixed stop 116 serving to limit the movement of the inertia element 101 in the right-hand direction. The arrangement of the inertia element 101 and the spring 114 is such that upon retardation of the vehicle or train while traveling in a forward direction, the inertia element 101 swings in the left-hand direction against the resisting force of the spring 114 to a degree dependent upon the rate of retardation of the vehicle.

The floating lever 102 is pivotally atached intermediate the ends thereof to one end of an element 118 which is supported by the casing of the switch device 104. A coil spring 121 fixed at one end to a stationary member 122 on the vehicle and connected at the opposite end to the floating lever 102 urges the lever 102 pivotally in a clockwise direction about the end of the element 118.

The switch device 104 comprises a casing 124 having a substantially horizontal bore 125 therein in which the element 118 supporting the floating lever 102 is supported for slidable movement therein.

For simplicity, the casing 124 is shown to be of insulating material whereby a pair of contact members 126 and 127, mounted in the casing, are insulated from each other. The contact member 127 is fixed in the casing 124 but the contact member 126 is movable with respect to the casing 124. For simplicity, contact member 126 is shown as carried on a stem 131 which is slidable in the casing 124 and which has on the end thereof a flange, a yielding spring 172 being interposed between the flange on the stem 131 and the casing to urge the contact member outwardly from the casing.

On an insulated portion of the element 118 are a pair of contact members 128 and 129 arranged to engage the contact members 126 and 127, respectively, in circuit-closing contact.

The rotary cam 103 of the retardation controller 14 is arranged to be rotated according to the rotary movement of the brake control handle 24 and is illustratively shown as fixed to the shaft 25 to which the brake control handle 24 is fixed. The rotary cam 103, furthermore, is arranged to rotate from the normal position shown corresponding to the release position of the brake control handle 24 in a counterclockwise direction upon movement of the brake control handle into the brake application zone, the eccentricity of the cam 103 increasing as the angular displacement of the cam in a counterclockwise direction increases. The cam 103 engages a roller 133 carried at the upper end of the floating lever 102, that is the end opposite the end connected to the arm 109 of the inertia element 101.

With the inertia element 101 in the normal position shown and with the rotary cam 103 in its normal position shown, the spring 121 exerts a force on the floating lever 102 in the right-hand direction so as to maintain the contact members 128 and 129 on the element 118 in engagement with the contact members 126 and 127, respectively. Upon operation of the brake control handle 24 from the release position thereof into the brake application zone, the corresponding rotary movement of the cam 103 in a counterclockwise direction shifts the upper end of the floating lever 102 in the left-hand direction against the resistance of the spring 121. The resistance of the spring 114 and the weight of the inertia element 101 is sufficient that the lower end of the floating lever 102 is held against movement upon rotation of the rotary cam 103 and thus the floating lever 102 is pivoted in a counterclockwise direction about its lower end to cause shifting of the contact carrying element 118 of the switch device 104 in the left-hand direction to effect disengagement of the contact members 128 and 129 from the contact members 126 and 127.

It should be noted that the contact member 127 is first disengaged by the contact member 129 as the element 118 moves in the left-hand direction, the spring 132 causing the contact member 126 to be maintained in contact with the associated contact member 128 after the contact member 129 disengages the contact member 127. As the contact carrying element 118 shifts further in the left-hand direction, the flange on the stem 131 carrying the contact member 126 engages the casing 124 and prevents further outward movement of the contact member 126 with respect to the casing so that the contact member 128 thereafter disengages the contact member 126.

With the brake control handle 24 remaining in the brake application zone and the rotary cam 103 correspondingly displaced from its normal position so as to cause disengagement of the contact members 128 and 129 from the contact members 126 and 127, respectively, of the switch device 104, the retardation of the vehicle or train causes the inertia element 101 to move in the left-hand direction, that is, pivot in a clockwise direction about the pin or shaft 106, and thus cause pivotal movement of the floating lever 102 in a counterclockwise direction about its upper end which is held against movement by the cam 103. The spring 114 is so designed, as previously indicated, that the angle through which the inertia element 101 swings is proportional to the rate of retardation of the vehicle or train and, therefore, it will be seen that the contact carrying element 118 of the switch device 104 will be returned in the right-hand direction a distance which is proportional to the rate of retardation of the vehicle or train. It will thus be apparent that reengagement of the contact members 128 and 129 on the contact carrying element 118 with the contact members 126 and 127, respectively, will be effected only when the amount of swing of the inertia element 101 corresponds to the displacement of the brake control handle 24 from its release position. As will be seen hereinafter, the degree to which the brake control handle 24 is shifted out of its release position thus determines the rate of retardation of the vehicle or train.

Considering, now, the electrical circuits whereby the retardation controller 14 controls the operation of the valve mechanism 13, it will be seen that the contact member 127 of the switch device 104 is connected by a wire 135 to one terminal of the magnet winding 85 of the release pilot valve device 34, the opposite terminal of the winding 85 being connected to the negative terminal of a battery 136, as through a ground connection in the manner shown or by a return wire, not shown. The contact member 126 of the switch device 104 is connected by a wire 137 to one terminal of the magnet winding 55 of the application pilot valve device 32, the other terminal of which is connected, as through ground, to the negative terminal of the battery 136.

A "deadman" switch 138 is provided to close and open the circuit through wire 137 and is shown as a simple push button type of switch having a contact bridging member 139 that is normally held in circuit-closing position against the resisting force of a yielding spring 141 by pressure manually applied by the operator. When the manually applied pressure is relieved, as due to the incapacitation of the operator, the spring 141 acts to shift the contact bridging member 139 to circuit-opening position to interrupt the circuit through wire 137.

The contact members 128 and 129 on the contact carrying element 118 of the switch device 104 are connected by a wire 143 to the positive terminal of the battery 136 and thus, with the "deadman" switch 138 in circuit-closing position and with the contact members 128 and 129, respectively, in engagement with the contact members 126 and 127, circuits are completed for energizing the magnet windings 55 and 85 of the application pilot valve device 32 and the release pilot valve device 34. Thus the pilot valve devices are each normally held in the position shown in the drawing.

As will be readily apparent from the drawings, the magnet windings 54 and 84 of the application pilot valve device 32 and the release pilot valve device 34, respectively, are connected in series relation across the terminals of the dynamic braking resistor 10, a normally closed switch, such as a knife switch 150, being provided to open this circuit if desired. Thus, as long as the braking current through the resistor 10 produces a voltage drop across the resistor 10 sufficient to cause the magnet windings 84 and 54 to be energized to a degree to overcome the resisting springs 58 and 88, the pilot valve devices 32 and 34 will be actuated to the position shown in the drawing. When the voltage drop across the dynamic braking resistor 10 decreases with the decrease in vehicle or train speed to such a degree that the magnet windings 84 and 54 are no longer energized to a degree sufficient to overcome the springs 58 and 88, the valves of the pilot valve devices 32 and 34 are shifted to the oppositely seated positions thereof. For a reason which will be hereinafter made apparent, the magnet winding 84 of the release pilot valve device 34 may be of a lesser number of turns than the magnet winding 54 of the application pilot valve device 32 so that, as the voltage drop on the dynamic braking resistor 10 falls, the release pilot valve device 34 will be shifted to its deenergized position prior to the application pilot valve device 32 being shifted to its deenergized position.

*Operation of equipment*

Assuming that the main reservoir 12 is charged to the normal pressure therein as from a fluid compressor, not shown, that the operator maintains the "deadman" switch 138 depressed in circuit-closing position, and that the vehicle or train is traveling along the road under power with the motor controller 8 conditioned to supply power to the driving motor 7 of the vehicle or train, the operator may effect an application of the brakes by rotating the brake control handle 24 from the release position into the application zone a degree corresponding to the desired rate of retardation.

Whether or not the operating handle 18 of the motor controller 8 is returned to circuit-opening position, the rotation of the rotary drum 21 of the drum controller 9 corresponding to the rotation of the brake control handle 24 automatically interrupts the motor control circuit and establishes the dynamic braking circuit through the braking resistor 10, in the manner previously described, upon the first slight initial movement of the brake control handle 24 out of its release position.

The operation of the brake control handle 24 causes shifting of the contact carrying element 118 of the switch device 104 in a left-hand direction to effect disengagement of the contact members 128 and 129 from the associated contact members 126 and 127, respectively, the degree of separation of the contact members depending upon the degree to which the brake control handle 24 is shifted out of release position. The magnet windings 85 and 55 of the release pilot valve device 34 and the application pilot valve device 32 are thus deenergized in succession in the order named, the magnet winding 85 being first deenergized because the contact member 129 disengages the contact member 127 prior to the disengagement of contact member 128 from contact member 126. The valves of the pilot valve devices 32 and 34 are not shifted from the position shown in the drawing, however, since the magnet windings 84 and 54 of the pilot valve devices 34 and 32, respectively, are energized by the current supplied from the dynamic braking circuit. Accordingly, the application valve device 31 remains seated to prevent the supply of fluid under pressure from the main reservoir 12 to the brake cylinder 11 and the release valve device 33 remains unseated to establish the release communication from the brake cylinder.

It will thus be seen that at the higher vehicle or train speeds, at which the dynamic braking current through the resistor 10 is sufficient to cause the magnet windings 84 and 54 to be sufficiently energized to maintain the valves of the pilot valve devices 32 and 34 in the positions shown, the fluid pressure brakes remain released.

If, while each of the pilot valve devices 32 and 34 is maintained in the position shown due to the magnet windings 54 and 84 being energized sufficiently from the dynamic braking circuit, the shifting of the inertia element 101 of the retardation controller in the left-hand direction due to the retardation of the vehicle or train should be sufficient to cause reengagement of the contact members 129 and 128 with the contact members 127 and 126 so as to effect energization of the magnet windings 85 and 55 of the pilot valve devices 34 and 32, no change in the condition of the pilot valve devices 32 and 34 occurs.

Now, as the speed of the vehicle or train decreases and the voltage drop across the dynamic braking resistor 10 correspondingly decreases so that sufficient current is not supplied to operatively energize the magnet windings 54 and 84 of the pilot valve devices 32 and 34, the pilot valve devices 32 and 34 are operated to the deenergized positions thereof previously described. The retardation controller is so designed and adjusted that when the dynamic braking current falls sufficiently to operatively deenergize the magnet windings 54 and 84 of the pilot valve devices 32 and 34 the rate of retardation of the vehicle or train is sufficiently low that the contact members 128 and 129 are out of engagement with the associated contact members 126 and 127 of the switch device 104 of the retardation controller 14.

Accordingly, with both of the magnet windings 54 and 55 of the pilot valve device 32 deenergized and with both of the magnet windings 84 and 85 of the release pilot valve device 34 deenergized, the release valve device 33 and the application valve device 31 are operated successively to closed and open positions, respectively, so that fluid under pressure is thus supplied from the main reservoir 12 to the brake cylinder 11 to effect application of the fluid pressure brakes.

As previously indicated, the magnet winding 84 of the release pilot valve device 34 may have a less number of turns than the magnet winding 54 of the application pilot valve device 32. The reason for such a feature should be apparent because the release valve device 33 is thus caused to be closed prior to the opening of the application valve device 31 so that fluid under pressure supplied from the main reservoir to the brake cylinder 11 cannot escape to atmosphere past the release valve device 33. Such leakage might occur if the application valve device 31 and the release valve device 33 were operated at the same instant, or the latter slightly ahead of the former.

Now, as the rate of retardation of the vehicle or train increases due to the application of the fluid pressure brakes, the inertia element 101 swings in a clockwise direction to an increasing extent, so that the contact member 128 engages the contact member 126 of the retardation controller switch device 104. The magnet winding 55 of the application pilot valve device 32 is thus energized and the valves 51 and 52 actuated to unseated and seated positions, respectively, so that main reservoir pressure is supplied past the unseated valve 51 to the chamber 35 of the application valve device 31 to effect seating of the application valve piston 36 to cut off the further supply of fluid under pressure to the brake cylinder 11.

As the rate of retardation of the vehicle or train subsequently further increases in the usual manner, while maintaining a fixed brake cylinder pressure, due to the increase in the coefficient of friction between the brake shoes and the braking surface on the vehicle wheels with decreasing vehicle speed, the retardation of the vehicle or train increases further the swing of the inertia element 101 in a clockwise direction sufficiently to cause reengagement of the contact member 129 with the contact member 127 of the switch device 104. Thus, the magnet winding 85 of the release pilot valve device 34 is energized and the valves 81 and 82 correspondingly shifted to unseated and seated positions, respectively. Accordingly, fluid under pressure is supplied from the main reservoir 12 to the chamber 71 of the release valve device 33, and the valve 65 of the release valve device 33 is thus unseated so that fluid under pressure is released from the brake cylinder 11 through the exhaust port 75 of the release valve device 33.

When the rate of retardation of the vehicle or train decreases sufficiently, due to the reduction of pressure in the brake cylinder 11, the inertia element 101 of the retardation controller 14 swings in a counterclockwise direction correspondingly to the decrease in the rate of retardation and thus effects disengagement of the contact member 129 from the contact member 127 of the switch device 104. The magnet winding 85 of the release pilot valve device 34 is correspondingly deenergized and the valves 81 and 82 are shifted to seated and unseated positions, respectively, so that the supply of fluid under pressure from main reservoir 12 to the chamber 71 of the release valve device 33 is cut off and fluid under pressure is vented to atmosphere from chamber 71 through the exhaust port 92 of the release pilot valve device 34. Thus, the valve 65 of the release valve device 33 is reseated to prevent the further reduction of pressure in the brake cylinder 11.

If as the speed of the vehicle or train subsequently reduces, the rate of retardation increases sufficiently to cause contact member 129 to again reengage the contact member 127 of the switch device 104, the magnet winding 85 of the release pilot valve device 34 is again energized and release valve device 33 is accordingly operated to release fluid under pressure from the brake cylinder 11 to a sufficient degree to cause disengagement of the contact member 129 from contact member 127.

The rate of release of fluid under pressure from the brake cylinder 11 through the exhaust port 75 is at such a rate that no overcasting occurs, that is, the reduction in the rate of retardation is not sufficiently rapid to cause disengagement of the contact member 128 from the contact member 126 of the switch device 104. Thus, the magnet winding 55 of the application pilot valve device 32 remains energized and consequently the application valve device 31 remains closed while the retardation controller 14 is controlling the operation of the valve mechanism 13. However, if for some reason the release valve device 33 sticks momentarily and permits more than a desired degree of reduction in brake cylinder pressure, so that contact member 128 disengages the contact member 126 of the switch device 104, then the pilot valve device 32 is operated correspondingly to control the application valve device 31 to permit the supply of fluid under pressure from the brake cylinder 12 from the main reservoir 12 to the brake cylinder 11 until such time as the retardation of the vehicle again causes reengagement of the contact member 128 with the contact member 126 of the switch device 104.

It will thus be seen that the retardation controller 14 regulates the retardation of the vehicle or train to a substantially constant rate from the time that it assumes control of the magnet valve mechanism 13.

It should now be apparent that the rate of retardation, as determined by the retardation controller 14, depends upon the degree of displacement of the brake control handle 24 into the application zone from the release position thereof, because the greater the displacement of the brake control handle 24 from the release position, the higher is the rate of retardation required to effect reengagement of contact members 128 and 129 with the contact members 126 and 127 of the switch device 104 of retardation controller 14.

Let it now be assumed that the vehicle or train is traveling along the road under power at a substantially constant rate of speed with the brakes released and that the operator becomes incapacitated, thereby relieving the manually applied pressure on the "deadman" switch 138 and the force holding operating handle 18 of the motor controller in "power-on" position. The operating handle 18 of the motor controller 8 accordingly returns automatically to "power-off" position, thus cutting off the supply of current to the driving motor 7, and the "deadman" switch 138 is operated to interrupt the circuit for energizing the magnet winding 55 of the application pilot valve device 32.

Upon the deenergization of the magnet winding 55 of the pilot valve device 32, while the magnet winding 85 of the release pilot valve device 34 remains energized, the chamber 35 of the application valve device 31 and the chamber 71 of the release valve device 33 are simultaneously vented to atmosphere past the unseated valve 52 of the pilot valve device 32 and to atmosphere through the exhaust port 60. The release valve device 33 and the pilot valve device 31 are thus substantially simultaneously actuated to closed and opened positions, respectively, and fluid under pressure is accordingly supplied from the main reservoir 12 to the brake cylinder 11 to effect an application of the brakes to the maximum degree of pressure of the main reservoir 12.

It will be apparent that since the brake control handle 24 remains in release position, the dynamic brake circuit through the resistor 10 is not established and, therefore, that the magnet windings 54 and 84 of the pilot valve devices 32 and 34, respectively, are not energized. Thus, upon deenergization of the magnet winding 55 of the pilot valve device 32 due to the actuation of the "deadman" switch 138 to circuit-opening position, the chamber 35 of the application valve device 31 is maintained vented to atmosphere through the exhaust port 60 of the pilot valve device 32 so that fluid under pressure continues to be supplied from the main reservoir 12 past the application valve device 31 until the pressure in the brake cylinder equalizes with that as supplied from the main reservoir 12.

It will be apparent also that since the upper end of the floating lever 102 of the retardation controller 14 is not displaced from its normal position due to that fact that the brake control handle 24 is not shifted out of its release position, the contact members 128 and 129 are not disengaged from the contact members 126 and 127 of the switch device 104. Furthermore, the inertia element 101 tends to swing in a clockwise direction upon retardation of the vehicle and thus exerts a force to maintain the contact members of the switch device 104 in engagement throughout the application of the brakes in a "deadman" application. Thus, the magnet winding 85 of the release pilot valve device 34 remains energized through the "deadman" application and, accordingly, the valve 81 remains unseated to establish the exhaust communication from the chamber 71 of the release valve device 33 to atmosphere through the exhaust port 60 of the application pilot valve device 32. The release valve device 33 is, accordingly, maintained in seated position closing the exhaust communication for the brake cylinder.

The fact that the retardation controller 14 is ineffective in a "deadman" application of the brakes is immaterial since the primary consideration upon incapacitation of the operator is to stop the vehicle or train as quickly as possible notwithstanding an uncomfortably high rate of retardation or possible sliding of some of the wheels.

Assuming that the brake control handle 24 has been shifted out of the release position to effect an application of the brakes, as previously described, or that a "deadman" application has been effected, the pressure established in the brake cylinder when the vehicle or train comes to a complete stop is the maximum pressure attainable in the brake cylinder 11. It will be apparent that, when the inertia element 101 of the retardation controller 14 returns into engagement with the stop 116 at the time the vehicle comes to a complete stop following an application of the brakes by operation of the brake control handle 24, the contact members 128 and 129 are correspondingly disengaged from the associated contact members 126 and 127 so that the magnet windings 55 and 85 of the pilot valve devices 32 and 34 are correspondingly deenergized. With the vehicle at a complete stop and the magnet windings 54 and 84 of the pilot valve devices 32 and 34 consequently deenergized due to lack of dynamic braking current from the dynamic braking circuit, the pilot valve devices 32 and 34 are correspondingly positioned to cause the release valve device 33 to be closed and the application valve device to be opened. Thus if the pressure in the brake cylinder 11 has been established at an intermediate pressure during the application of the brakes, the retardation controller 14 so controls the valve mechanism 13 as to cause maximum pressure in the brake cylinder 11 when the vehicle comes to a complete stop the same as in the case of a "deadman" application. Adequate braking effort to hold the vehicle or train on a grade is thus provided automatically when a vehicle or train comes to a stop.

It will be apparent that the lock-out of the fluid pressure brakes under the control of the dynamic brakes occurs only if the switch 150 is in closed position. If it is desired, for some reason, not to use the lock-out feature just mentioned, switch 150 is opened. The circuit through the magnet windings 54 and 84 of the application pilot valve device 32 and release pilot valve device 34, respectively, is thus interrupted and the operation of the pilot valve devices is not controlled in any way by the degree of current in the dynamic braking circuit including the resistor 10.

In such case, it will be apparent that unless the retarding effect produced by the dynamic brake is sufficient to maintain a rate of retardation as selected by the degree of displacement of the brake control handle 24 out of its release position, the retardation controller 14 will be effective to so control the magnet valve mechanism 13 as to establish such a pressure in the brake cylinder as to cause an additional retardation effect on the vehicle sufficient to maintain the selected rate of retardation. Thus, as the retardation effect of the dynamic brake decreases with the decrease in speed of the vehicle, the retardation controller 14 operates automatically to control the magnet valve mechanism 13 to increase the brake cylinder pressure a sufficient degree to maintain the retardation of the vehicle at the rate selected by the position of the brake control handle 24.

*Summary*

Summarizing, it will be seen that I have disclosed a brake system comprising an electric brake equipment, in the form of a dynamic brake, and a fluid pressure brake equipment including application and release magnet valve devices each having two magnet windings, one of which is under the control of the dynamic brakes and the other of which is under the control of a retardation controller. As long as the dynamic brake is effective above a certain degree, the magnet windings of the magnet valve devices controlled thereby are effective to prevent application of the fluid pressure brakes. When the degree of application of the dynamic brakes falls below the certain degree, the retardation controller takes over the control of the magnet valve devices and regulates the application of the fluid pressure brakes so as to produce a substantially constant rate of retardation of the vehicle or train, as determined by the amount of displacement of a brake control handle out of a release position into a brake application zone.

The arrangement of the magnet valve devices controlling the supply of fluid under pressure to effect application of the fluid pressure brakes is such that the deenergization of one of the magnet valve devices from its normally energized condition as a result of operation of a "deadman" switch device upon incapacitation of the operator, causes application of the fluid pressure brakes to a maximum degree.

It will, furthermore, be apparent that I have disclosed a novel construction of a retardation controller for regulating the retardation of the vehicle or train so as to maintain a substantially constant rate according to the degree of displacement of a brake operating element out of a release position into an application zone.

While I have disclosed only one embodiment of my invention, it will be apparent that various omissions, additions or modifications may be made in the embodiment shown without departing from the spirit of my invention. It is, accordingly, not my intention to limit the scope of my invention except as it is necessitated by the scope of the prior art.

Having now described my invention, what I claim as new and desire to secure by Letters Patent, is:

1. In a vehicle brake system, an electric brake equipment, a fluid pressure brake equipment, manually operative means for effecting an application of the electric brakes, a magnet valve mechanism for controlling the degree of braking force effecting an application of the fluid pressure brakes, a retardation controller operated by the manually operative means to cause operation of the magnet valve mechanism to initiate an application of the fluid pressure brakes, and operative in response to the retardation of the vehicle to cause operation of the magnet valve mechanism to so control the degree of braking force effecting application of the fluid pressure brakes as to regulate the retardation of the vehicle to a substantially constant rate, and means effective as long as the electric brakes exert more than a certain degree of braking effort for rendering the magnet valve mechanism ineffective to initiate or control the degree of braking force for an application of the fluid pressure brakes in response to the operation of said retardation controller.

2. In a vehicle brake system, a dynamic brake equipment including a dynamic braking circuit, a fluid pressure brake equipment, manually operative means for establishing the dynamic braking circuit and thereby causing said dynamic brake equipment to exert a retarding effect on the vehicle, a magnet valve mechanism for controlling the degree of braking force effecting application of the fluid pressure brakes, a retardation controller operated by the manually operative means to cause operation of the magnet valve mechanism to initiate an application of the fluid pressure brakes and operative in response to the retardation of the vehicle to cause operation of the magnet valve mechanism to so control the degree of braking force effecting an application of the fluid pressure brakes as to regulate the retardation of the vehicle to a substantially constant rate, and means energized from the dynamic braking circuit for preventing operation of the magnet valve mechanism, in response to the operation of the retardation controller, either to initiate or control the degree of braking force for an application of the fluid pressure brakes, as long as the current in the dynamic braking circuit exceeds a certain value.

3. In a vehicle brake system, a dynamic brake equipment including a dynamic braking circuit, a fluid pressure brake equipment including a brake cylinder, an application magnet valve device having two separate magnet windings effective when either winding is energized to cause closure of a communication through which fluid under pressure is supplied to the brake cylinder and when both windings are deenergized to cause the communication to be established through which fluid under pressure is supplied to the brake cylinder, a release valve device having two separate magnet windings effective when either winding is energized to cause a communication to be established through which fluid under pressure is released from the brake cylinder and when both windings are deenergized to cause closure of said release communication, means for supplying energizing current to one magnet winding of the application magnet valve device and one magnet winding of the release magnet valve device according to the current in the dynamic braking circuit, and means controlled according to the rate of retardation of the vehicle for controlling the energization of the remaining magnet winding of the application magnet valve device and the remaining magnet winding of the release magnet valve device.

4. In a vehicle brake system, a dynamic brake equipment including a dynamic braking circuit, a fluid pressure brake equipment including a brake cylinder, an application magnet valve device having two separate magnet windings effective when either winding is energized to cause closure of a communication through which fluid under pressure is supplied to the brake cylinder and when both windings are deenergized to cause the communication to be established through which fluid under pressure is supplied to the brake cylinder, a release valve device having two separate magnet windings effective when either winding is energized to cause a communication to be established through which fluid under pressure is released from the brake cylinder and when both windings are deenergized to cause closure of said release communication, means for supplying energizing current to one magnet winding of the application magnet valve device and one magnet winding of the release magnet valve device according to the current in the dynamic braking circuit, and means conditioned according to the rate of retardation of the vehicle for normally effecting energization of the remaining magnet winding of the application magnet valve device and the remaining magnet winding of the release magnet valve device and effective upon the retardation of the vehicle to effect in succession the deenergization of the magnet winding of the release magnet valve device and the magnet winding of the application valve device, the magnet winding of the application valve device and of the release magnet valve device controlled according to the current in the dynamic braking circuit being effective to prevent operation of the magnet valve devices to initiate the supply of fluid under pressure to the brake cylinder until the current in the dynamic braking circuit reduces below a certain uniform value.

5. In a vehicle brake system, a dynamic brake equipment including a dynamic braking circuit effective upon the flow of current in said circuit for exerting a retarding effect on the vehicle, means for establishing said braking circuit, a fluid pressure brake equipment including a brake cylinder, an application valve means including two separate magnet windings either of which is effective when energized to cause the valve means to close communication through which fluid under pressure is supplied to the brake cylinder and effective when both are deenergized to cause the valve means to establish communication through which fluid under pressure is supplied to the brake cylinder, a release valve means including two separate magnet windings either of which is effective when energized to cause the release valve means to establish a communication through which fluid under pressure is released from the brake cylinder and effective when both are deenergized to cause the release valve means to close the said release communication, one magnet winding of the application valve means and one magnet winding of the release valve means being energized according to the current in the dynamic braking circuit and effective, respectively, to cause the application valve means and the release valve means to prevent the supply of fluid under pressure to the brake cylinder and to release fluid under pressure from the brake cylinder as long as the current in the dynamic braking circuit exceeds a certain uniform value, and a retardation controller which controls the remaining magnet windings of the application valve means and the release valve means and which is effective when the current in the dynamic braking circuit reduces below the certain uniform value to control energization and deenergization of the magnet windings in a manner to cause said valve means to so control the supply of fluid under pressure to and the release of fluid under pressure from the brake cylinders as to regulate the retardation of the vehicle to a substantially constant rate.

6. A vehicle brake system comprising a brake cylinder, fluid pressure responsive valve means for controlling the supply of fluid under pressure to the brake cylinder to effect an application of the brakes, an application magnet valve device for effecting variations in the fluid pressure on the supply valve means to cause operation thereof, a fluid pressure responsive valve means operative in response to variations of fluid under pressure acting thereon to control the release of fluid under pressure from the brake cylinder, and a release magnet valve device for effecting variations in the pressure acting on the release valve means to cause operation thereof, said two magnet valve devices being so arranged that when both are deenergized, the supply valve means and the release valve means are operated so as to cause fluid under pressure to be supplied to the brake cylinder to build up a pressure therein, and so that when the release magnet valve device is energized and the application magnet valve device is deenergized, the supply valve means and the release valve means are also operated to cause fluid under pressure to be supplied to the brake cylinder to build up a pressure therein.

7. In a vehicle brake system, a brake cylinder, an application magnet valve device effective, when deenergized, to cause communication to be established through which fluid under pressure is supplied to the brake cylinder to effect an application of the brakes and, when energized, to cause said communication to be closed, and a release magnet valve device effective, whenever deenergized, to cause a communication through which fluid under pressure is released from the brake cylinder to be closed and, when energized while the application magnet valve device is deenergized, for also causing said release communication to be closed, and when energized while said application magnet valve device is energized for causing said communication to be established through which fluid under pressure is released from the brake cylinder.

8. In a vehicle brake system, a brake cylinder, a normally energized application magnet valve device effective, when deenergized, to cause communication to be established through which fluid under pressure is supplied to the brake cylinder to effect an application of the brakes and, when energized, to cause said communication to be closed, and a normally energized release magnet valve device effective, whenever deenergized, to cause a communication through which fluid under pressure is released from the brake cylinder to be closed and, when energized while the application magnet valve device is deenergized, for also causing said release communication to be closed, and when energized while said application magnet valve device is energized for causing said communication to be established through which fluid under pressure is released from the brake cylinder, a retardation controller for controlling the magnet valve devices to control the pressure in the brake cylinder so that the retardation of the vehicle is regulated to a substantially constant rate, and independent means operative to effect deenergization of the application magnet valve device at any time, to effect the supply of fluid under pressure to the brake cylinder independently of the retardation controller.

9. A vehicle retardation controller device comprising an inertia element which has a certain normal position and which is shifted different degrees out of its normal position dependent upon the rate of retardation of the vehicle, a manually operative element having a certain normal position and shiftable different degrees out of its certain normal position, a floating lever which is positioned differently according to the position of the manually operative element and the position of the inertia element, and means controlled according to the position of the floating lever for controlling the vehicle brakes.

10. A vehicle retardation controller device comprising an inertia element which has a certain normal position and which is shifted different degrees out of its normal position dependent upon the rate of retardation of the vehicle, a manually operative element having a certain normal position and shiftable different degrees out of said certain normal position, a floating lever so constructed and arranged as to be positioned at one end according to the position of the inertia element and positioned at the opposite end according to the degree to which the manually operative element is shifted out of its normal position, and means controlled according to the movement of the said floating lever for controlling the vehicle brakes.

11. A vehicle retardation controller device comprising an inertia element which has a certain normal position and which is shifted different degrees out of its normal position dependent upon the rate of retardation of the vehicle, a floating lever having one end thereof positioned according to the position of the inertia element, a manually operative element having a normal position and shiftable different degrees out of its normal position to cause a corresponding movement of the other end of said floating lever pivotally in one direction about the said one end, means operated by such movement of said floating lever to initiate an application of the brakes, said inertia element being effective to shift the said one end of the floating lever pivotally in the opposite direction about the said other end of the floating lever to cause operation of said last means to limit and control the degree of application of the brakes according to the degree to which the manually operative element is displaced out of its normal position.

12. A vehicle retardation controller device comprising an inertia element which has a certain normal position and which is shifted different degrees out of its normal position according to the rate of retardation of the vehicle, a manually operative element having a certain normal position and shiftable different degrees out of its normal position, an element supported for axial movement in opposite directions, a floating lever pivotally carried on said element, one end of the said floating lever being positioned according to the position of the inertia element and the opposite end of said lever being positioned according to the degree of displacement of the said manually operative element out of its normal position, and means operated by the movement of said element in response to the positioning of said floating lever for controlling the degree of application of the vehicle brakes.

13. A control device comprising an inertia element which has a certain normal position and which is shiftable out of its normal position according to the degree of the inertia force acting thereon, a manually operative element having a certain normal position and operative different degrees out of its normal position, a floating lever positioned according to the position of the inertia element out of its normal position and the position of the manually operative element out of its normal position, and circuit-controlling means operatively controlled according to the position of the said floating lever.

14. In a vehicle brake system, in combination, a dynamic brake equipment including a dynamic braking circuit effective upon the flow of current in said circuit to exert a retarding force on the vehicle, a manually operative element having a certain normal position and effective upon movement out of its normal position to establish said braking circuit, fluid pressure brake equipment including a brake cylinder, an inertia element having a normal position and shifted out of its normal position different degrees according to the rate of retardation of the vehicle, a floating lever having one end positioned according to the position of the inertia element and the opposite end positioned according to the degree to which the manually operative element is shifted out of its normal position, and means controlled according to the position of the floating lever for controlling the supply of fluid under pressure to and the release of fluid under pressure from the brake cylinder.

DAVID W. LLOYD.